United States Patent [19]

Harvey et al.

[11] Patent Number: 4,641,936
[45] Date of Patent: Feb. 10, 1987

[54] FILM LEADER POSITIONING APPARATUS

[75] Inventors: Frederick W. Harvey, Webster; Glenn W. Johnson, Rochester, both of N.Y.

[73] Assignee: Eastman Kodak Company, Rochester, N.Y.

[21] Appl. No.: 818,164

[22] Filed: Jan. 13, 1986

[51] Int. Cl.⁴ ............................................. G03B 1/04
[52] U.S. Cl. ................................. 354/212; 354/288
[58] Field of Search ............... 354/212, 213, 214, 215, 354/216, 288

[56] References Cited

U.S. PATENT DOCUMENTS

| | | | |
|---|---|---|---|
| 4,332,452 | 6/1982 | Seely | 354/288 |
| 4,334,751 | 6/1982 | Jinsenji | 354/288 |
| 4,429,976 | 2/1984 | Sekine | 354/203 |
| 4,516,843 | 5/1985 | Ohmura | 354/212 |
| 4,600,285 | 7/1986 | Harvey | 354/212 |

Primary Examiner—A. A. Mathews
Attorney, Agent, or Firm—Roger A. Fields

[57] ABSTRACT

In a bottom loading camera, a loading chamber receives a film cartridge in an axial direction substantially at the same time a film leader projecting from the cartridge is transversely received in a feed path between the loading chamber and a take-up chamber. By mounting a back door for pivoting proximate an end of the camera body closest to the loading chamber, a cartridge positioning member on the door can axially depress the cartridge in the chamber to properly position the cartridge as the door is initially closed. Then, with continued closure of the back door, cooperating means on the door and adjacent the feed path can transversely position the film leader to straighten it along the path in the event the leader is skewed. Next, a film guide on the door can urge the forward end of the film leader against a take-up spool in the take-up chamber to enable the spool to engage the leader end. Thus, the leader end will have benefited from any previous correction to the film cartridge or the film leader.

5 Claims, 5 Drawing Figures

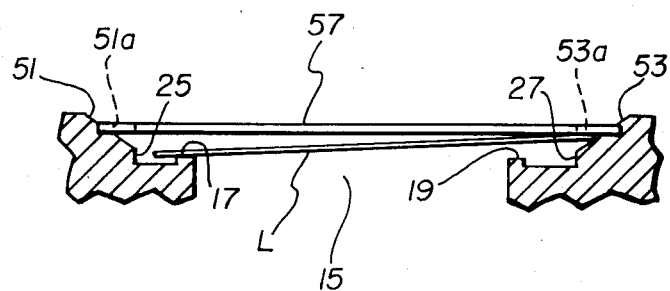
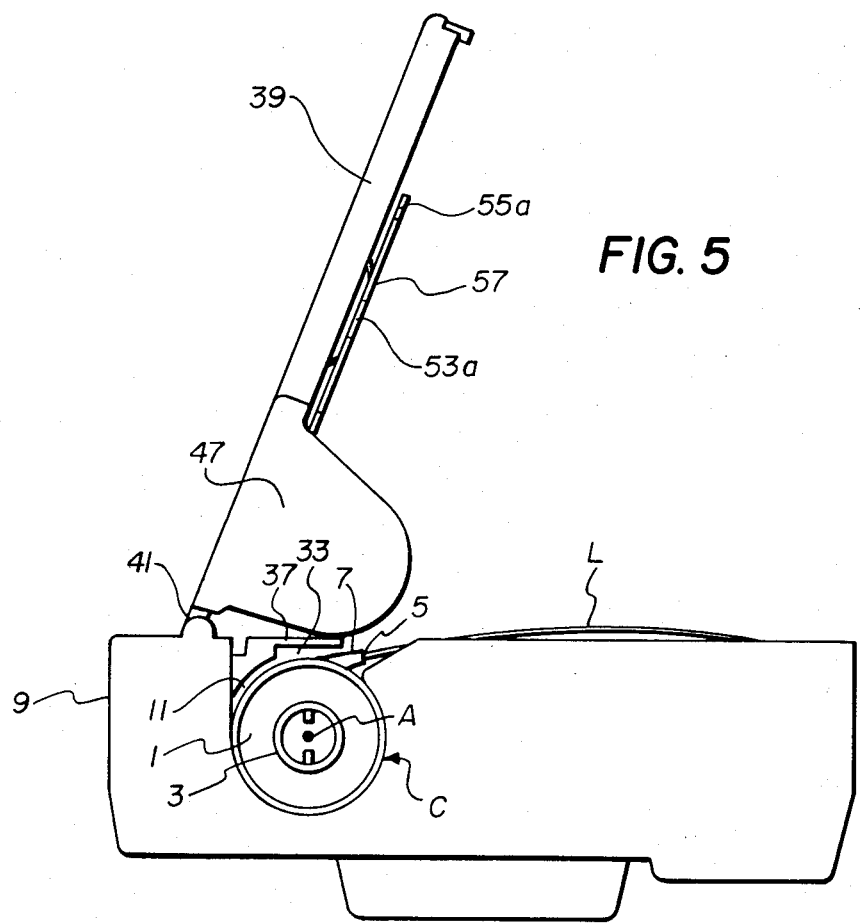

FILM LEADER POSITIONING APPARATUS

BACKGROUND OF THE INVENTION

1. Field of the Invention

The invention relates generally to photographic cameras and in particular to those cameras for use with a film cartridge having a projecting film leader. More particularly, the invention relates to improved means for ensuring that the projecting film leader is properly positioned in a film feed path when the cartridge is loaded in the camera.

2. Description of the Prior Art

Recently, Fuji Photo Film Co., Ltd., has made available several drop-in loading (DL) 35 mm cameras. In a DL type camera, the film cartridge is inserted in an axial direction through a bottom opening into a loading chamber of the camera. At the same time, the film leader projecting from the film cartridge is transversely received in a film feed path which extends between the loading chamber and a film take-up chamber in the camera. Typically, the forward end of the film leader extends sufficiently into the take-up chamber to partially overlap a take-up spool in that chamber.

When the film cartridge and projecting film leader are received in a DL type camera, it is important to have the cartridge properly positioned in the loading chamber and to have the leader properly positioned in the feed path and the take-up chamber before a back door of the camera is closed. If the film leader is skewed, i.e., runs at an oblique angle, from the egress opening of the cartridge or the cartridge is not completely received in the loading chamber, the leader can be trapped out of its proper position when the back door is closed. As a result, a film metering sprocket in the feed path may not be able to engage the film leader at its perforations or the sprocket may rip the leader at its perforations as the sprocket attempts to advance the leader. Similar problems can occur when a toothed take-up spool in the take-up chamber attempts to take-up the forward end of the leader.

In commonly assigned U.S. Pat. No. 4,332,453, granted June 1, 1983, there is disclosed a DL type camera having a cartridge positioning member which is disposed on a bottom door of the camera to depress the film cartridge in the axial direction in the loading chamber as the door is initially closed. The cartridge positioning member ensures that the film cartridge is properly positioned in the loading chamber before the bottom door and a coupled back door are completely closed. The two doors are closed by pivoting them about parallel axes which extend lengthwise along the body of the camera.

The Fuji DL-50 camera has cooperating means which are disposed on the camera body adjacent the film feed path and on the back door, respectively, for transversely positioning the film leader to straighten it in the event the leader is skewed from the feed path. The cooperating means function to transversely position a skewed leader in response to closure of the back door, and they comprise a ramp on the camera body which is inclined towards the feed path and a pressure plate on the back door. The pressure plate has a cut-out which is shaped to admit the ramp as the back door is closed. When the film leader is skewed, it overlaps the ramp. Thus, as the back door is closed, a skewed leader will be forced by an edge portion of the pressure plate which defines the cut-out to slide down the ramp, thereby transversely positioning the film leader to straighten it along the feed path.

In a DL type camera, such as the Fuji DL-50 camera, the back door is pivotally connected to the camera body at a location between the take-up chamber and an end of the camera body closest to the take-up chamber. Consequently, as the back door is initially closed, a guide member on the back door will be moved to a position for urging the forward end of the film leader into engagement with a toothed take-up spool in the take-up chamber before the edge portion of the pressure plate which defines the cut-out can cooperate with the ramp on the camera body to straighten the leader in the event it is skewed. The forward end of the leader, therefore, may become trapped between the guide member and the take-up spool, thereby preventing the leader from being straightened in the event it is skewed. At this point, even if a cartridge positioning member, such as described in U.S. Pat. No. 4,332,453, for depressing the film cartridge in an axial direction in the loading chamber were employed it would do little to correct the position of the leader. Thus, the metering sprocket in the feed path and the toothed take-up spool will not operate to advance the leader, and the camera user may not be aware of this failure during picture-taking.

SUMMARY OF THE INVENTION

The above-described problems associated with DL type cameras are believed to be solved by the invention. The invention solves these problems by mounting a back door of the DL type camera for pivoting proximate an end of the camera body closest to the loading chamber, rather than the take-up chamber as in the above-described Fuji DL-50 camera. By pivoting the back door of the DL camera proximate the loading end of the camera body, a cartridge positioning member on the back door can first axially depress the film cartridge in the loading chamber to properly position the cartridge as the door is initially closed. Then, with continued closure of the back door, leader positioning means on the door and adjacent the feed path can transversely position the film leader to straighten it along the feed path in the event the leader is skewed. Next, a leader guide member on the back door can urge the forward end of the straightened leader against the take-up spool in the take-up chamber to enable the spool to engage the leader end. Thus, the leader end will have benefited from any previous correction to the film cartridge or the film leader.

BRIEF DESCRIPTION OF THE DRAWINGS

FIG. 4 is a side section view of the pressure plate and the ramp; and

FIG. 5 is bottom elevation view of the camera, shown with the back door opened and the film cartridge in the loading chamber.

DESCRIPTION OF THE PREFERRED EMBODIMENT

The invention is disclosed as being embodied preferably in a 35 mm drop-in loading (DL) camera. Because such a photographic camera is generally known, this description is directed in particular to camera elements forming part of or cooperating directly with the disclosed embodiment. It is to be understood, however, that camera elements not specifically shown or described may take various forms known to persons of ordinary skill in the art.

Figure 1:
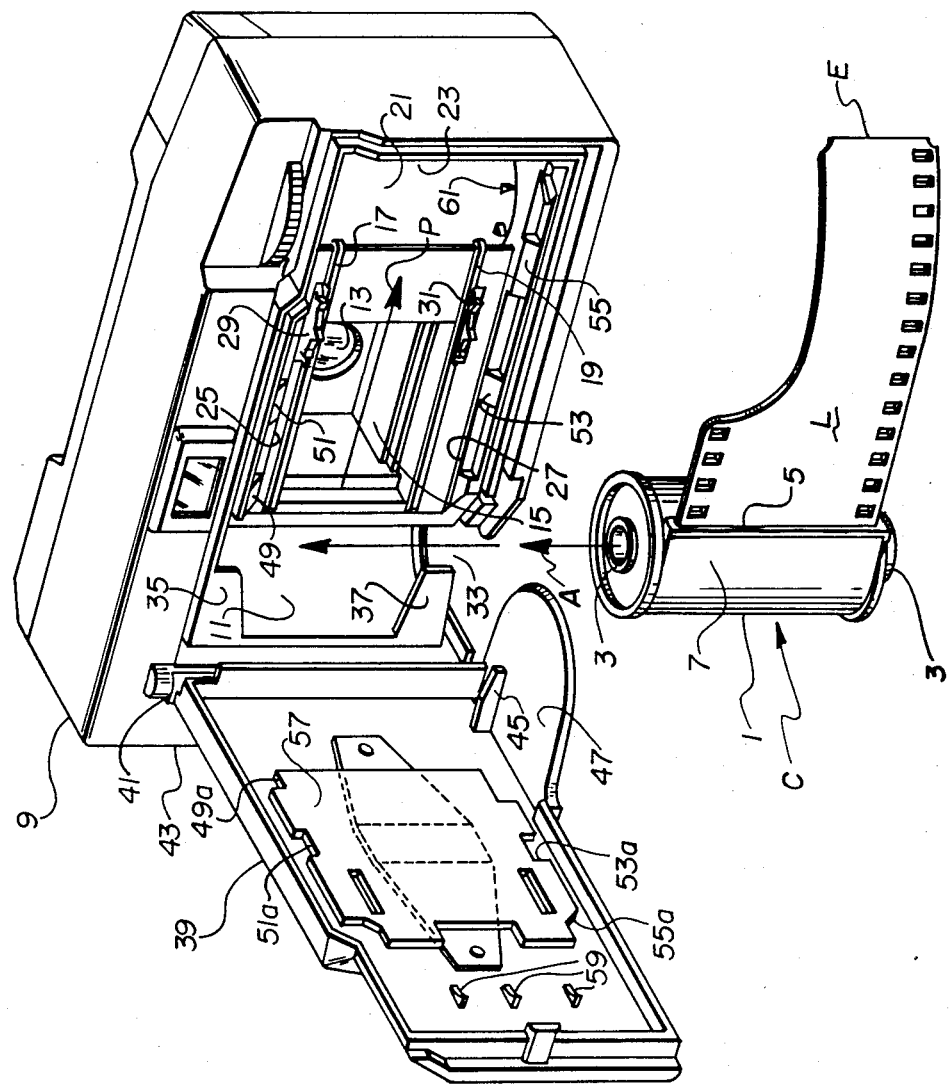
FIG. 1 is a rear perspective view of a DL type camera according to a preferred embodiment of the invention, shown with a back door of the camera opened and a film cartridge positioned for insertion axially into a loading chamber of the camera.

Referring now to the drawings, and in particular to FIG. 1, a DL type camera is shown for use with a known 35 mm film cartridge C, such as manufactured by Eastman Kodak Company. The cartridge C comprises a light-tight film container 1 housing a rotatably supported spool 3 on which is wound an edge-perforated 35 mm film roll. A film leader L longitudinally protrudes from a plush-lined, light-trapped slit 5 in a throat portion 7 of the container 1. The film leader L protrudes a predetermined length, e.g. 2⅜ in., from the slit 5 and originally is curled about the container 1.

The DL type camera comprises a camera body 9 in which is provided a number of conventional elements, such as a cartridge loading chamber 11, a picture-taking lens 13 located within a film exposure aperture 15, a pair of substantially parallel film plane rails 17 and 19 for supporting successive film frames during film exposure at the exposure aperture, a film take-up drum 21 rotatably supported within a film take-up chamber 23, a pair of substantially parallel film guides or film edge-limiting members 25 and 27 which define the lateral limits of a film feed path indicated by the arrow P, and a pair of film metering sprockets 29 and 31 in the feed path. In the DL type camera, the film cartridge C is inserted in an axial direction through a bottom opening 33 into the loading chamber 11. See FIGS. 1 and 5. The axial direction is indicated by the arrow A. During such insertion, the cartridge C is received in the loading chamber 11 with the throat portion 7 of the cartridge generally extending towards the take-up chamber 23. At the same time, the projecting film leader L is transversely received in the feed path P, preferably coming to rest between the two film guides 25 and 27. Usually, a forward end E of the film leader L extends sufficiently into the take-up chamber 23 to partially overlap the take-up drum 21. A pair of rigid tongues 35 and 37 fixed to the camera body 9 extend across the loading chamber 11 to facilitate insertion of the cartridge C into such chamber in the correct orientation.

Figure 2:
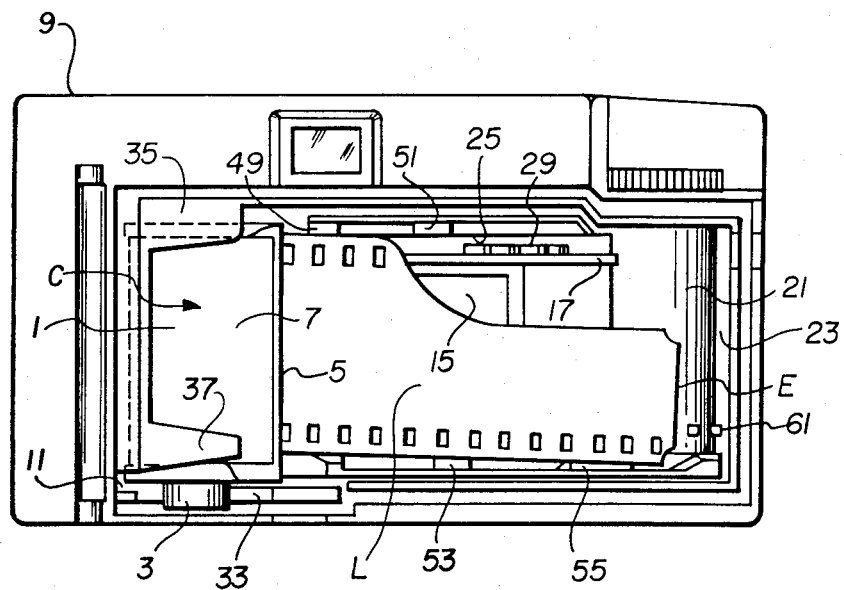
FIG. 2 is a rear elevation view of the camera, shown with the back door removed for clarity purposes and with the film leader of the film cartridge skewed from the film feed path in the camera.

When the film cartridge C and projecting film leader L are received in the DL type camera, it is important to have the cartridge completely inserted in the loading chamber 11 and to have the leader properly positioned in the feed path P before a back door 39 of the camera is fully closed. If, as shown in FIG. 2, the film leader L is skewed, i.e. runs at an oblique angle, from the slit 5 in the throat portion 7 of the cartridge or the cartridge is not completely inserted in the loading chamber 11, the leader will extend transversely out of the feed path P. In the prior art Fuji DL-50 camera described above, the film leader may be trapped out of its proper position when the back door of the camera is closed. This, as will be explained below, is prevented in the preferred embodiment of the invention.

According to the invention as shown in FIG. 1, the back door 39 is supported at a post-like extension 41 by an internal center pin (not shown) for pivotal opening and closing movement about an axis which is located proximate an end 43 of the camera body 9 closest to the loading chamber 11. The axis is coextensive with the internal pin and, therefore, is not illustrated. It is obvious, however, from FIG. 1 that the axis extends substantially parallel to the axial direction A the film cartridge C is inserted in the loading chamber 11.

When the back door 39 is initially closed, a cartridge positioning rib 45 on the inside of a bottom extension 47 of the back door will depress the film cartridge C in the axial direction A in the loading chamber 11 in the event the cartridge is not completely inserted in that chamber. Thus, by pivoting the back door 39 at the loading end 43 of the camera body 9, the film cartridge C is the first to be properly positioned.

Figure 3:
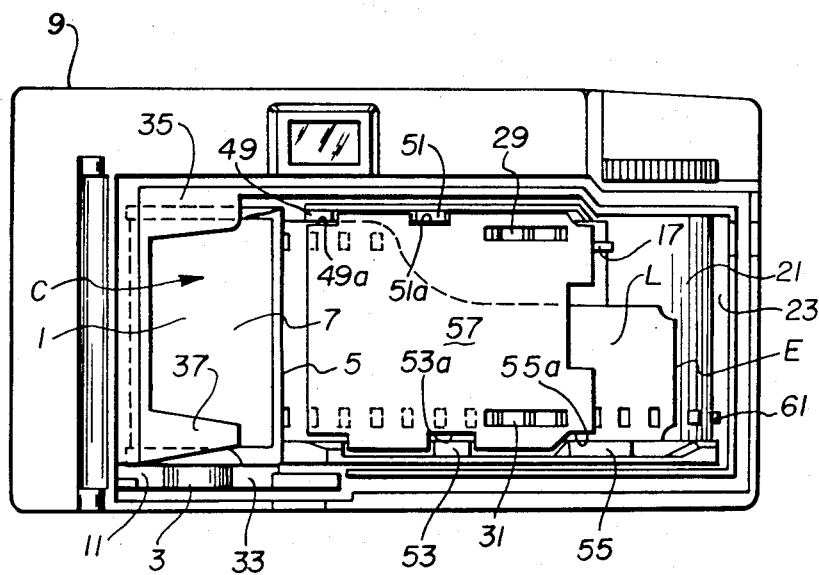
FIG. 3 is a rear elevation view of the camera, shown with a pressure plate engaging a ramp to straighten the film leader in the feed path.

Cooperating means are disposed on the camera body 9 adjacent the film guides 25 and 27 and on the inside of the back door 39, respectively, for transversely positioning the film leader L to straighten it in the event the leader is skewed from the feed path P. The cooperating means function to transversely position a skewed leader in response to continued closure of the back door 39 after the cartridge positioning rib 45 has properly positioned the film cartridge C in the loading chamber 11. As shown in FIGS. 1-4, the cooperating means comprise a plurality of ramps 49, 51, 53, and 55 on the camera body 9 which are inclined laterally toward the feed path P and a pressure plate 57 which is spring-supported on the inside of the back door 39. The pressure plate has a like number of cut-outs 49a, 51a, 53a, and 55a which are shaped to admit the respective ramps 49, 51, 53 and 55 as closure of the back door 39 is continued. When the film leader L is skewed in the manner shown in FIGS. 2 and 4, it overlaps the two ramps 53 and 55. In this instance, as the back door 39 is closed, the cut-outs 53a and 55a will admit the ramps 53 and 55, and the skewed leader will be forced by the respective edge portions of the pressure plate 57 which define such cut-outs to slide down the ramps, thereby transversely positioning the film leader to straighten it along the feed path P, as shown in FIG. 3. Similarly, when the film leader L is skewed to overlap the two ramps 49 and 51, the respective portions of the pressure plate 57 which define the cut-outs 49a and 51a will cooperate with such ramps to properly position the skewed leader in the feed path P.

Next, as the back door 39 is finally closed, several film guide fins 59 on the inside of the door will be moved into a position opposite the take-up drum 21 to urge the forward end E of the film leader L into engagement with a circumferential array of teeth 61 on the drum. Thus, the leader end E will have benefited from any previous correction to the film cartridge C or the film leader L.

The invention has been described in detail with particular reference to a preferred embodiment thereof, but it will be understood that variations and modifications can be effected within the spirit and scope of the invention. For example, the invention could be utilized in a back (rear) loading camera, rather than a bottom loading camera as in the preferred embodiment.

We claim:

1. An improved photographic camera of the type wherein (a) a loading chamber receives a film cartridge in an axial direction substantially at the same time a film leader projecting from the cartridge is transversely received in a feed path, (b) a cartridge positioning member is disposed on a back door to depress the film cartridge in the axial direction in said loading chamber, to properly position the cartridge in the chamber, in response to closure of the door, and (c) cooperating means are disposed adjacent said feed path and on said back door, respectively, for transversely positioning the film leader in the event it is skewed, to straighten the leader along the path, in response to closure of the door, and wherein the improvement comprises:

means mounting said back door for closure to enable said cartridge positioning member to axially position the film cartridge in the loading chamber before said leader positioning means can transversely position the film leader in said feed path.

2. The improvement as recited in claim 1, wherein said mounting means mounts said back door for pivotal closing movement to first cover said loading chamber and then cover said feed path.

3. The improvement as recited in claim 2, wherein said mounting means mounts said back door for pivotal closing movement proximate an end of the camera body closest to said loading chamber and about an axis extending substantially parallel to the axial direction the film cartridge is received in the loading chamber.

4. An improved photographic camera of the type wherein (a) cooperating means are disposed adjacent a film feed path and on a back door, respectively, for transversely positioning a film leader in the event it is skewed, to straighten the leader in the path, in response to closure of the door, (b) film take-up means is disposed in a take-up chamber for engaging the film leader, and (c) a leader guide is disposed on said back door to move to a position for guiding the film leader against said film take-up means in response to closure of the door, and wherein the improvement comprises:

means mounting said back door for closure to enable said leader positioning means to transversely position the film leader in said feed path before said leader guide is moved to its position for guiding the film leader against said film take-up means.

5. An improved photographic camera of the type wherein (a) a loading chamber receives a film cartridge in an axial direction substantially at the same time a film leader projecting from the cartridge is transversely received in a feed path between said loading chamber and a take-up chamber, (b) a cartridge positioning member is disposed on a back door to depress the film cartridge in the axial direction in said loading chamber, to properly position the cartridge in the chamber, in response to closure of the door, and (c) cooperating means are disposed adjacent said feed path and on said back door, respectively, for transversely positioning the film leader in the event it is skewed, to straighten the leader along the path, in response to closure of the door, (d) film take-up means is disposed in said take-up chamber for engaging the film leader, and (e) a leader guide is disposed on said back door to move to a position for guiding the film leader against said film take-up means in response to closure of the door, and wherein the improvement comprises:

means mounting said back door for pivoting to first cover said loading chamber, then cover said feed path, and next cover said take-up chamber, whereby as the back door is closed said cartridge positioning means can first axially position the film cartridge in the loading chamber, said leader positioning means can then transversely position the film leader in the feed path, and said leader guide is next moved to its position for guiding the film leader against said film take-up means.

* * * * *